Figure 1:
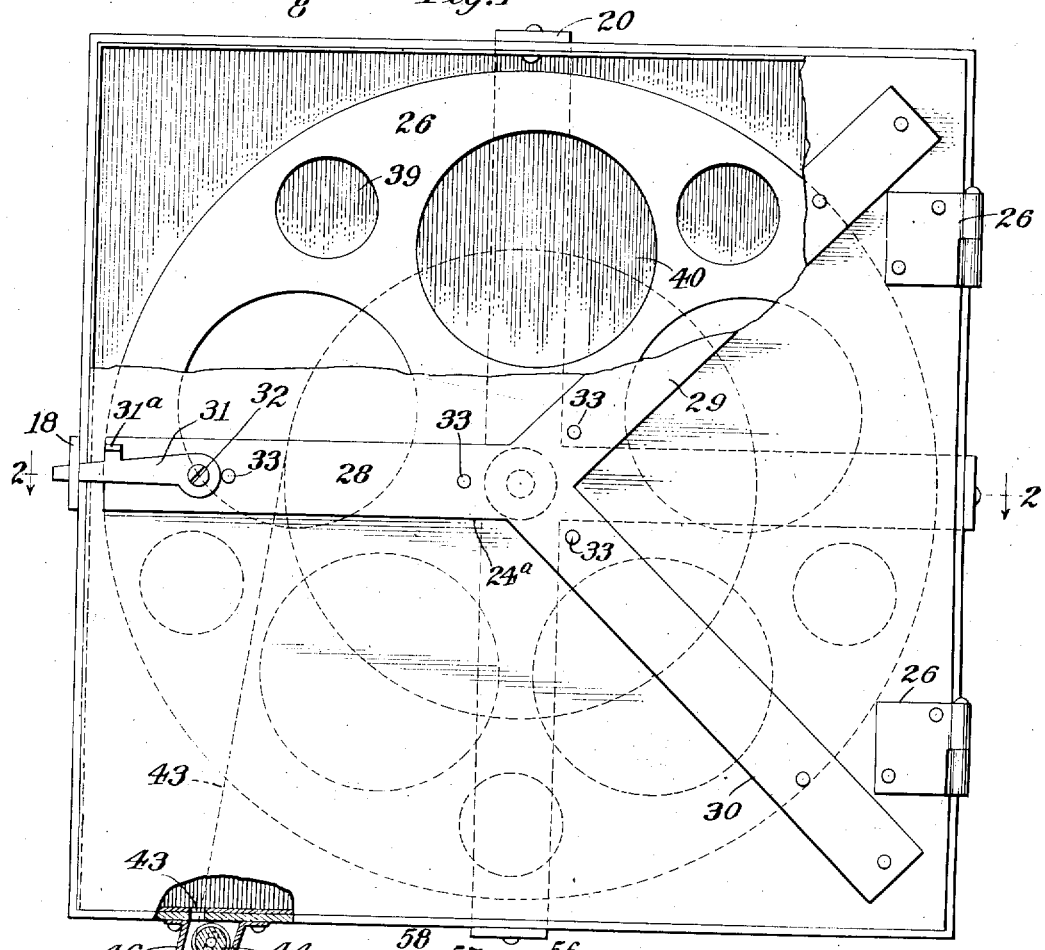

W. A. DIETZE.

MAGAZINE FOR MOVING PICTURE MACHINES.

APPLICATION FILED MAY 4, 1915.

Reissued Aug. 1, 1916.

14,174.

2 SHEETS—SHEET 1.

Witnesses:
L. E. Johnston
M. E. Eveland

Inventor
Walter A. Dietze.

By his Attorney W. B. Morton

W. A. DIETZE.

MAGAZINE FOR MOVING PICTURE MACHINES.

APPLICATION FILED MAY 4, 1915.

Reissued Aug. 1, 1916.

14,174.

2 SHEETS—SHEET 2.

Witnesses:
L. E. Johnston
M. E. Eveland

Inventor
Walter A. Dietze

By his Attorney W. B. Morton

UNITED STATES PATENT OFFICE.

WALTER A. DIETZE, OF CHICAGO, ILLINOIS, ASSIGNOR TO NICHOLAS POWER COMPANY, OF NEW YORK, N. Y., A CORPORATION OF DELAWARE.

MAGAZINE FOR MOVING-PICTURE MACHINES.

14,174. Specification of Reissued Letters Patent. Reissued Aug. 1, 1916.

Original No. 1,081,926, dated December 16, 1913, Serial No. 681,583. Application for reissue filed May 4, 1915. Serial No. 25,861.

*To all whom it may concern:*

Be it known that I, WALTER A. DIETZE, a citizen of the United States, and a resident of Chicago, in the county of Cook and State of Illinois, have invented certain new and useful Improvements in Magazines for Moving-Picture Machines, of which the following is a full, clear, and exact specification.

This invention relates to improvements in magazines for moving picture machines respectively inclosing the supply and receiving reels upon which the moving picture film is unwound, which magazines are provided with a door hinged at one side for the insertion and removal of the reels for changing films, and which are also provided at their respective film outlet and inlet with a pair of rollers both of which are grooved to form a contracted passage and guide for the film, but mainly as a means preventing fire entering and burning or exploding any part within the magazines and either of them. Heretofore, however, in all magazines, for moving picture machines, designed to inclose a reeled film, both the supply and receiving reels are operative when the doors of the magazines are open, or even partly open, with the result that the films are not only accessible to fire through the doorway, but through the passage in the rollers, by reason of the supply of air through the doorway, when, on the other hand, with the door closed, there is an insufficient supply of oxygen in the magazine to produce combustion, further prevented by a more or less vacuum therein, and especially in the supply magazine, due to the rapidity of movement of the film passing therefrom. In other words, prolonged practice has demonstrated it to be impossible for fire to ignite or enter either of the magazines when provided with the roller constructed passage above referred to provided the door of the magazine is closed, and yet the fact remains that the film contents of these magazines be it great or small, not infrequently take fire when the door is left open, or even partly open, on the ignition of the film passing before the moving picture machine between the two magazines and in some instances through the doorway from the spark of a match, cigar, cigarette or other source, in the hand of the operator igniting and exploding the film to the peril of both the life and limb of the operator, the public, and the destruction of property.

It is with startling frequency that even experienced and skilled operators as well as others, in their hurry to put their machine in operation do leave one or both doors open, sometimes through over-confidence from having before successfully operated the machine in the absence of an explosion, at other times through carelessness, but more frequently in the belief that the doors have been swung to a closed position when they have not, and remain sufficiently open for the passage of air into the magazine, until finally the film therein is ignited and exploded before it is possible to close either door for securing the protection it was intended to afford and would procure if the door were closed against accidental opening.

Moving picture films are very thin and of great length, with but a very short portion exposed between the two magazines, and although composed of gun cotton, a very high explosive and easily ignitible material, the danger from the ignition between the two points, to life, limb, loss of film and surrounding property, is nothing as compared with the explosion of the massed bulk of film in one or both magazines during the operation of the machine, and hence the importance of providing some means by which magazines are made impossible of explosion when the film is more or less exposed to ignition as it must be during the operation of the machine for throwing the illuminated picture to a suitable background.

In every moving picture machine before this invention provided with a magazine, the film is invariably operative when the magazine doors are open as well as when closed, and in view of the danger from the operation of the film while the doors are open, as above related, it is apparent that any means by which it is possible and practical to prevent the operation of the film while the doors are open is a substantial advance in the art to which this invention is directed.

The object of this invention broadly stated is to prevent the operation of the film of a moving picture machine when the doors of either magazine are open, and until both doors are in a closed position, or more specifically stated until the doors of both magazines are locked in their closed position.

A further object of this invention is to provide a moving picture machine with means by which it is possible and practical to shift the film from an inoperative to an operative position by a force applied directly to the reel shaft, produced through the closing of the door of its magazine.

A still further object of this invention is to automatically compel the film of a moving picture machine provided with a magazine, to shift the shaft of both reels from an operative to an inoperative position the instant that the door of the magazine moves from a closed toward an open position.

Still more specifically stated, the object of this invention is a moving picture machine having a magazine in which the reel shaft is automatically moved to its operative position by the closing of the magazine door and automatically shifted out of its operative position on the opening of a magazine door, that is to say, in which the reel shaft is connected with its driving mechanism when the door is closed, and is locked to the shaft bearing the instant the locked door is moved toward an open position.

Another object of this invention is a moving picture machine, the reels of both of which magazines may be and are so connected with the magazine doors that neither reels is operative until both doors are closed and locked, and that the reels in both magazines automatically move to an inoperative position on the moving of the closed door to an open position, and that each reel remains inoperative until its door is closed and locked.

A further object of this invention is to prevent objectionable friction between the bearing of a magazine door and the shaft of a reel on moving the latter from an inoperative to, and while maintaining it in an operative position, for a film wound thereon.

Another object of this invention is to brace and stay magazines constructed from sheet metal so as to prevent their warping and bending under pressures and strains due to this invention, and at the same time utilize one of said stays as a keeper for a latch locking its door in a closed position.

With these ends in view, my invention finds embodiment in certain features of novelty in the construction, combination and arrangement of parts by which the said objects and certain other objects are hereinafter attained, all as fully described with reference to the accompanying drawings and more particularly pointed out in the claims.

Figure 2:
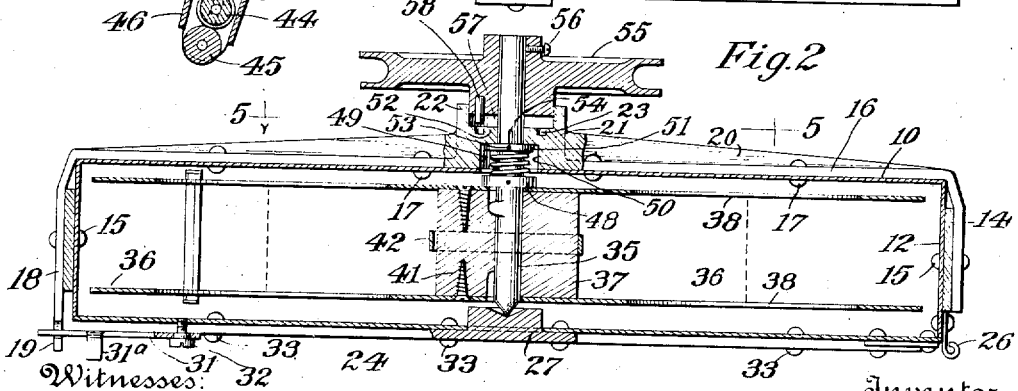
Figure 3:
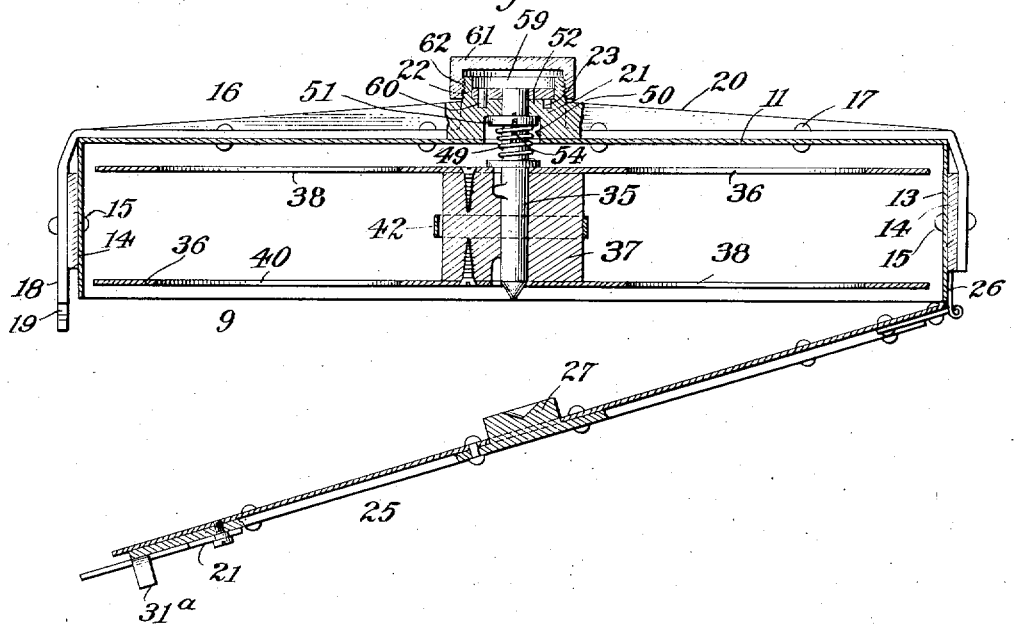
Figure 4:
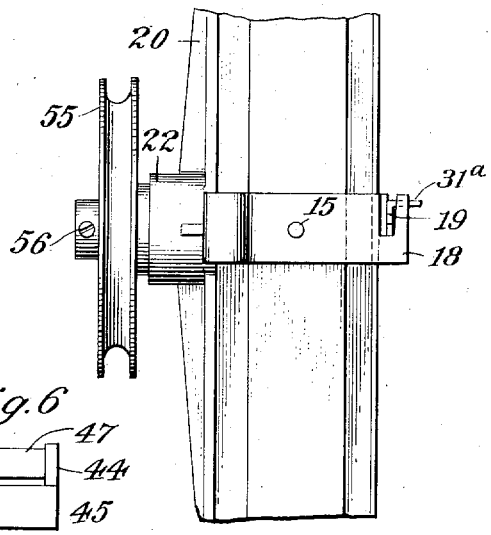
Figure 5:
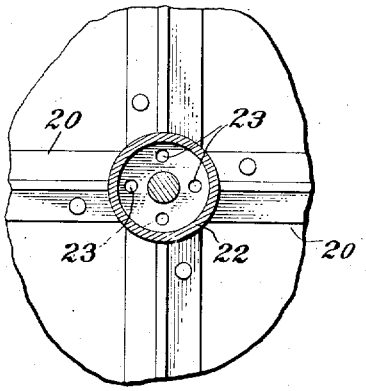
Figure 6:
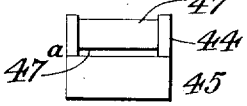
Figure 7:
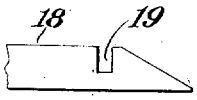

In said drawings: Figure 1 illustrates in front elevation partly in section a magazine for a moving picture machine. Fig. 2 shows a transverse section of the usually lower, or receiving magazine on the line 2—2 of Fig. 1 with the door thereof shown in a closed and locked position. Fig. 3 illustrates a transverse section of the usually upper or supply magazine with the door thereof in an open position. Fig. 4 illustrates a detail side elevation of the receiving, or lower magazine, looking in the direction of the latch keeper. Fig. 5 is a detail section on the line 5—5 of Fig. 2. Fig. 6 is a detail front elevation of the rollers between which the film is directed from one magazine into the other; and, Fig. 7 is a detail of the keeper for the latch locking the magazine doors closed.

Similar characters of reference indicate the same parts in the several figures of the drawing.

The bodies of the receiving magazine 8 (Fig. 1) and of the supply magazine 9 (Fig. 3) may be of cast metal, but are preferably made from a single sheet of metal respectively forming the rear ends 10 and 11 and sides 12 and 13. Both of these magazines have their sides stiffened by a somewhat thick metal strap 14 secured thereto by rivets 15, which pass through the arms of a triangular spider 16 and the magazine, and further secured to the end wall 10 of the magazine by rivets 17 with one arm 18 of the spider projecting beyond the rim, and provided with a notch 19 forming the keeper for the latch one end for a door for closing the magazines, as hereinafter described. Spider 16 is strengthened by ribs 20 which may be cast with or separately secured to its legs, and is axially provided with a hub 21 having a flange 22 surrounding one or more circular recesses 23, in the hub.

The supply and receiving magazines are respectively provided with doors 24 and 25, secured to one side of the magazine by hinges, 26, and are stiffened by a spider 24[a] having formed therewith a case hardened bearing block 27 at the juncture of its legs and axially of the door. The spider has three legs 28, 29, and 30, one of which, leg 28, projects to the free edge of the door and has mounted thereon a latch 31 pivoted to the leg by a screw 32 and adapted to en gage (see Figs. 3, 4 and 7) the notch 19 in the arm 18 when, and only when the door is tightly closed, the spider being secured to the door by rivets 33. In both of these magazines removably mounted upon shafts 35 are reels 36 of the usual and ordinary construction, that is to say provided with hubs 37 and opposing flanges 38—38 which are perforated for lightness as indicated at 39 and 40, secured to the hub by screws 41, the hubs being each provided with a spring clip 42 for securing thereto the end of the film to be wound upon the reels, and from which the film 43 (see Fig. 1) passes from the supply reel through an opening in the magazine between rollers 44 and 45. One of these rollers 44, is entirely confined within and the other roller 45, partly confined in a spout-like housing 46. There is also a similar opening, pair of rollers and housing (not shown) for the receiving or take up reel, through and between which the film passes to that reel, and in both instances one of these rollers (see Fig. 6) and may be both, is provided with a peripheral groove 47 across which the other roller extends to form a closed passage 47[a] for the film, the structure of both of these outlets and inlets, however, being old for the purpose of preventing fire igniting the film between the two reels from entering either magazine, and which it can do only when the magazine doors are left open during the operation of the machine.

The outer and free ends of the shafts 35 are cone shaped and bear against the block 27 when the magazine doors are closed, the opposing end of the shaft being cone shaped, and the bearing block 27 provided with a corresponding recess of hardened metal to so reduce the friction between the shaft and the door as not to retard the revolution of the former or, in other words, to reduce friction between the shaft and the door to a minimum as far as may be.

Shafts 35 have secured thereon collars 48 forming a stop limiting the inward movement of the reels and a seat for one end of a spring 49 coiled about the shaft 35 projecting into an enlarged recess or chamber 50 in the hub 21 against a collar 51 bearing against the end wall of the recess 50, the outer end of the hub being contracted adjacent the recess 50 to form the bearing 52 of the shaft 35 in which collars 51 are secured to the shafts 35 by a pin 53 projecting into a slot 54 in their shafts so that the shafts may have an endwise movement through the collars 51 and the reels with their film be moved outwardly by the expansion of the spring 49 to the position shown in Fig. 3, and inwardly by the force of their doors on closing it, as shown in Fig. 2.

As so far described the structures of the supply and receiving magazines, the reels and their operating mechanism are precisely the same, and are differentiated as now to be described only for the purposes of adapting the two structures to both reels and due to the fact that a driving power must be applied to one of the reels, namely the receiving reel, to take up the film delivered from the mechanism intermittently feeding the film throughout the machine, and for which purpose there is secured as usual (see Fig. 2) to the shaft 35 of the receiving reel a grooved belt driven pulley 55, the hub of which is secured to the shaft 35 by a screw 56 with the opposite end of the hub normally projecting into the chamber 57 formed by the flange 22 of the hub, the opposing end of the hub being provided with a single pin 58 adapted to register with the perforated recesses 23 in the hub 21 of the spider 16, there preferably being at least four of these recesses 23 at such intervals in the spider hub as will provide for the engagement of the pin 58 therewith at any quarter turn of the shaft 35 in order to avoid a full turn of the shaft for the engagement of the pin. From the foregoing it will now be seen by reference to Fig. 2 that immediately the closed door therein is moved toward an open position, the spring will expand and move the shaft 35 together with the reel and film thereon outwardly toward the open door and at the same time engage the pin 58 with the recess 23 next adjacent thereto, with the result that the film is locked against the possibility of again operating until the door is closed and locked by the engagement of the latch 31, with the recess 19 in the spider leg 18, and furthermore that until this engagement of the latch with its keeper, the spring, on releasing the door, will force the film out of the position it must have for its operation.

As there is no driving mechanism for the supply magazine film other than that furnished by the film feeding mechanism of the machine, there is (see Fig. 3) secured to the end of the shaft 35 adjacent its bearing in the spider hub, a disk 59 confined in the chamber provided for the flange 22 to the underside of which is secured a pin 60 adapted to register with the perforations 23 the disk being inclosed by a cap 61 screwed on the annular flange, as indicated at 62, projecting above the disk 59 a sufficient distance for the pin clearing the perforations 23, the operation of this disk and pin end of the shaft, film and door being precisely the same as that before described concerning the structure in Fig. 2 and with the same result, namely that with the door open as shown in Fig. 3 the spring 49 is shown to be expanded and to have moved the pin to engagement with one of the recesses 23 and locked the shaft, reel and film of the supply reel against the possibility of operating until the door 25 is fully closed and locked.

For convenience in the manipulation of the latches 31, they are both provided with a thumb piece 31[a].

While I have shown and described certain and specific devices and mechanism in which this invention finds embodiment, and by which it is first made practical and possible to certainly prevent by any means, and especially means operating automatically, the operation of the reels of the films under the doors of both magazines of a moving picture machine are closed and locked it is apparent that my invention is not, and should not be limited to any of these details of construction, when there is present any of the construction capable of, or adapted to prevent the operation of the film in the absence of the doors of the magazines being closed, or by which the reels of either one, or both magazines, are operative only when the openings for their insertion and removal are sealed against the admission of air sufficient to prevent fire entering and igniting any portion of the film within such magazine.

In conclusion it should be observed that my invention is not limited to the employment of a door which swings from a closed to an open position, but includes broadly any door, the opening of which on any means or in any direction, permits a film reel to be automatically moved out of its operative position, and the force of the closing of which reëngages the film with its operative mechanism, and my invention also includes any common and well known form of clutch adapted for locking the film reel against operating on the opening of the door, and as a substitute for the spring, any device the force of which automatically moves the film reel out of its operative position on the opening of the door to a magazine inclosing the same.

Having described my invention, what I claim and desire to secure by Letters Patent is:

1. In a magazine structure for moving picture machines, the combination of a reel shaft a reel therefor upon which the film thereof is supported, a magazine for inclosing said reel, and means for moving said shaft, whereby the reel is maintained against operating until the opening in the magazine for the insertion and removal of its film is sealed against the admission of air therethrough sufficient for the ignition of the film, substantially as described.

2. In a magazine structure for moving picture machines, the combination of a shaft, a reel fixed thereon means for supporting and inclosing said reel, and means shifting said shaft to thereby maintain the reel against operation until the inclosing means are sealed against the admission of air sufficient for the ignition of the film therein, substantially as described.

3. In a magazine structure for moving picture machines, the combination of a film, a support for the opposite end portions of the film, means for operating said support and the film, means for inclosing the same, means for the introduction of the film to said inclosure, and means for laterally shifting the film, and thereby preventing the operation of the film until its inclosure is sealed against the substantial admission of air, as and for the purpose described.

4. In a magazine structure for moving picture machines, a combination of film supply, and receiving reels, magazines for inclosing said reels and film, provided with doors for the insertion and removal of the reels, and means whereby one or both of said reels are bodily moved to their operative position on the closing of its door, and likewise out of operative position when its door is moved toward an open position, substantially as described.

5. A magazine for moving picture machines, comprising in combination film supply and receiving reels, means for simultaneously operating said reels, magazines therefor provided with doors, means connecting said doors with and shifting said reels, whereby the reels are moved to an operative position by the closing of the doors, and out of operation when the doors are open, substantially as described.

6. A magazine structure for moving picture machines comprising in combination a magazine, a door therefor, a film reel inclosed by said magazine, a shaft for said reel, means by which said shaft is automatically moved, and means for locking the shaft against operation on the opening of the door, and until moved by contact with the door on closing the same, substantially as described.

7. A magazine structure for moving picture machines comprising in combination film supply receiving reels, and actuating shafts for and supporting said reels, a spring on each of said shafts, one end of which is connected with the shaft, and the other with a hub therefor, stops actuated to engagement by the spring, magazines having doors providing a bar for one end of said shaft whereby the closing of said doors moves said shaft to a position disengaging said stops, substantially as described.

8. A magazine structure for moving picture machines comprising in combination magazines, film supply and receiving reels adapted to be inclosed by said magazines, a supporting shaft for each of said reels, means for moving said shafts longitudinally, a driving pulley on one of said shafts, and means respectively engaged and disengaged by the movement of said shaft for preventing the operation of the machine, substantially as described.

9. A magazine structure for moving picture machines comprising in combination a magazine, a reel therein, a door for closing said magazine, a hub mounted upon said reel, a shaft journaled in said hub, means for removably securing the reel to the shaft, recesses in said hub, a driving pulley provided with a stop for engaging said recesses, and means whereby on the opening of the magazine for the insertion and removal of a reel, said stop and recesses engage and lock the pulley against movement and on closing the magazine it will disengage, substantially as described.

10. In a mechanism of the class described, the combination with a magazine having a door on one side thereof, a film reel supported in said magazine, means for driving said film reel, means for normally preventing rotation of said film reel, and means operative upon the closing of said magazine door for rendering said last named means inoperative.

11. In a machine of the class described, the combination with a reel for a roll of film to be fed through a moving picture machine, a magazine inclosing said reel having one side thereof forming a door, means for rotatably supporting said reel in said magazine, means preventing the rotation of said film reel, and means controlled by the closing of said magazine door for releasing said last named means.

12. In a machine of the class described, the combination with receiving and delivering reels of a moving picture machine, magazines inclosing said reels each having a door on one side thereof, means including a shiftable device for preventing exhibition of said film when said magazine doors are opened, and means operatable upon the closing of said doors for shifting said device to release said last mentioned means.

13. In a machine of the class described, the combination of a magazine inclosing a reel of film and provided with means for rotating said film reel, means for preventing the operation of said film comprising a member having an operative and an inoperative position and adapted to normally assume its inoperative position, and means for adjusting said member to its operative position comprising a part carried by the magazine door adapted when said magazine is closed to shift and maintain said member in its operative position.

14. In a mechanism of the class described, the combination of a fireproof casing, a door on one side of the casing, a driving mechanism including a power driven shaft mounted in said casing, means for preventing rotation of said shaft normally operative when said door is open, said mechanism including a shiftable part operated upon the closing of the door for adjusting said last named means to render said shaft rotatable.

Signed at Chicago, in the county of Cook and State of Illinois this 11 day of March, 1915.

WALTER A. DIETZE.

Witnesses:
JNO. G. ELLIOTT,
M. B. ELSNER.

Copies of this patent may be obtained for five cents each, by addressing the "Commissioner of Patents, Washington, D. C."